Aug. 18, 1942.     I. CISSKI     2,293,592
LENS MOUNT INDEX ORIENTATION
Filed July 10, 1940
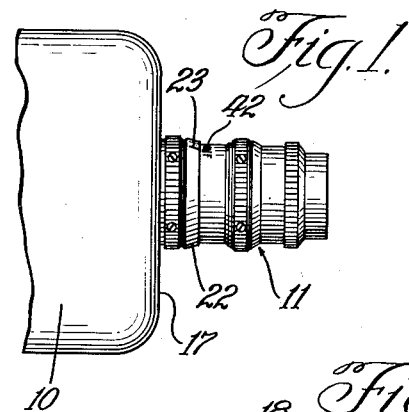
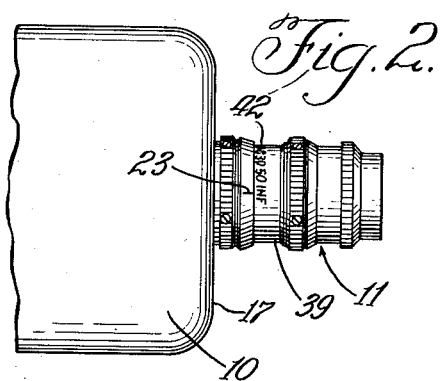
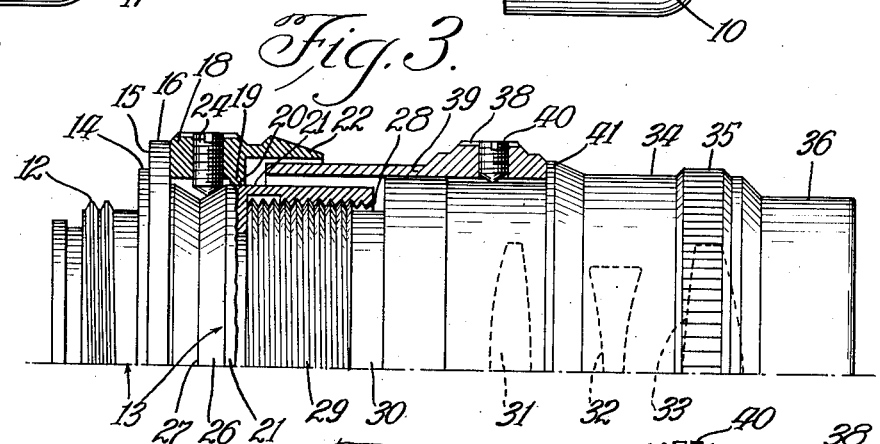
Inventor:
Irving Cisski
By- Robert F. Miehle
Att'y.

Patented Aug. 18, 1942

2,293,592

UNITED STATES PATENT OFFICE 2,293,592

LENS MOUNT INDEX ORIENTATION

Irving Cisski, Schiller Park, Ill., assignor to General Scientific Corporation, Chicago, Ill., a corporation of Illinois Application July 10, 1940, Serial No. 344,747

6 Claims. (Cl. 88—57)

This invention concerns a lens mount for a camera or the like and relates particularly to scale and index means for indicating an adjustable setting thereof.

The invention has for its general object the provision of a new readily adjustable assembly of complemental scale and index members for a lens mount which permits of the scale and index members being coordinately oriented to conveniently accommodate an unpredetermined angular mounted position of the lens mount.

The above and other desirable objects are attained by virtue of certain features of novelty in the construction, combination and arrangement of parts all as fully described with reference to the annexed drawing and more particularly pointed out in the appended claims.

In the said drawing—

Fig. 1 is a fragmentary plan view of a camera casing together with a lens mount therefor embodying scale and index members constructed in accordance with the present invention;

Fig. 2 is a view similar to Fig. 1 and showing the lens mount in an extreme position of focal adjustment.

Fig. 3 is an enlarged view, partly in section, illustrating in detail the scale and index members incorporated into the lens mount structure of Figs. 1 and 2;

Fig. 4 is a sectional view taken axially of and through the index member; and

Fig. 5 is a sectional view taken axially of and through the scale member which functions complementally with said index member.

Referring now to Figs. 1 and 2 of the drawing there will be seen a casing 10 for an optical instrument such as a camera, and a substantially cylindrical lens mount structure generally designated 11 which has an end secured in said casing. The lens mount is attachable to the casing 10 by means of screw threads 12 which encircle a sleeve 13 near its left end as illustrated in Fig. 3, said threads 12 being meshable with threads within an opening (not shown) in the instrument casing 10. The lens mount is firmly assembled with the casing when the circumferential periphery of a shoulder 14 is projected snugly into the side wall of said casing opening (not shown) and after the sleeve 13 has been rotated sufficiently for the threads 12 to have drawn the left face 15 of a flange 16 against the side wall 17 of the casing 10.

It will be conceived in the forming of the threads 12 upon the left end of the sleeve 13 that these threads cannot easily be spaced with predetermined exactness from the stop flange 16, nor can the beginning and end of the threads be exactly placed circumferentially of the sleeve without extreme time-consuming care. Neither can the axial or rotative positions of the threads (not shown) in the casing 10 with which the threads 12 are to mesh be predetermined with uniformity. It follows, if commercially practical precision standards are employed, that the sleeve 13 cannot be relied upon to occupy a predetermined selected rotational position with respect to the casing 10 upon merely being screwed home with the face 15 tightly against the casing side wall 17. Should scale and index means be employed which involves a scale or index member made integral with the sleeve 13, the scale and index means would most likely be improperly oriented with respect to the casing 10, but the present invention overcomes this difficulty by employing scale and index means which is capable of orientation relatively to the sleeve 13.

An index member 18 has an interior flange-like section 19 which carries a bearing surface 20 of reduced radius and short axial extent. This bearing surface 20 fits closely upon a bearing surface 21 of the ring 13 and thus carries the index member 18 in a manner permitting of both axial and rotative adjustment thereof with respect to the sleeve 13. A bevelled flange section 22 of said member 18 carries an index mark 23, visible in Figs. 1 and 2. After the ring or index member 18 has been rotated to a desired position of orientation which is usually upwardly with respect to the casing 10 as illustrated in Fig. 2, a plurality of wedge means in the form of set screws 24 which are plainly shown in Fig. 4 will be advanced radially inwardly of said member 18 for pressing their conical end sections 25 against the right flank 26 of a camming groove 27 circumscribing the sleeve 13. The camming action between the conical sections 25 and the bevelled cam surface 26 advances the member 18 endwise to the left into firm engagement with the flange 16. Meanwhile said sections 25 frictionally engage the surface 26 to augment the frictional resistance created between the left end of the member 18 and the right face of the flange or circumferential abutment means 16 in preventing rotational displacement of said member 18 from the selected orientated position. This uniform spacing of the set screws 24 together with their wedging action in pressing the member 18 endwise against the flange 16 makes it possible to diminish the length of the machined bearing surface 20 which in fact then serves principally as a pilot for holding the members 13 and 18 in coaxial alignment while the coupling forces between these members are applied between the flange 16 and the left end of the member 18 and between the cam surface 26 and the set screws 24.

Internal threads 28 in the right end portion of the sleeve 13 receive an exterior threaded section 29 upon and adjacently to the left end of a sleeve or control member 30 of the lens mount structure 11. This sleeve 30 is composed of several fabricated parts of which the detail is unimportant to the present disclosure, it being thought sufficient to explain that said parts carry an objective lens system comprising the lenses shown in dotted outline respectively at 31, 32, and 33. An iris (not shown) is also enclosed within the fabricated sleeve 30 and such iris is controlled by a ring 34 which has a quilled section 35 by means by which it may be conveniently grasped by the fingers for adjustively rotating the same upon the sleeve 30. A visor ring 36 of customary construction may be secured to the right end of the fabricated sleeve 30.

Focal adjustment of the lens system comprising the lenses 31, 32 and 33 is accomplished by rotating the sleeve or control member 30 for causing the intermeshed threads 28 and 29 to advance or retract the lens system axially of the structure, depending upon the direction of rotation. This adjustment is achieved by grasping the quilled peripheral section 38 of a sleeve-like scale member 39 which is held in a selected rotational position upon the sleeve 30 by means of set screws 40 which are distributed equidistantly about the member 39 as in Fig. 5. The position of the member 39 axially of the sleeve 30 is determined by placing the right end thereof in abutting relation with the left face of a flange 41 upon the sleeve 30. A scale 42, arranged circumferentially of the sleeve 39 for cooperation with the index mark 23 (see Fig. 2), is graduated in terms of focal length, and the graduations thereof are spaced at distance correlated with the pitch of the threads 28 and 29 in the manner well understood in the art.

Coordination is established between the focal position of the lens system 31—32—33 and the cooperative relation between the scale 42 and the index mark 23, after the ring 18 carrying the mark 23 has been secured in oriented position on the sleeve 13, by first loosening the set screws 40 so the member 39 may be adjusted rotatively of the sleeve 30. Thereupon said sleeve 30 will be rotated for advancing the lens system to one of its extreme positions of focal length, such as at infinity. The member 39, while being held firmly against the flange 41, will then be rotated into the position in which the scale division opposite the index mark 23 will correspond to the actual focal adjustment. This having been done the scale member 39 will be in position for cooperating with the index mark 23, whereupon the set screws 40 will be turned for advancing them radially inwardly of the member 39 for projecting their points into the body of the sleeve 30 to hold said sleeve 39 securely in place. Thereafter any focal adjustment of the lens mount structure will be indicated on the scale 42 opposite the index mark 23.

While my improved complemental scale and index member assembly has been described in association with parts for effecting focal adjustment in a lens mount structure, the invention is equally applicable to other environments. Moreover, it is contemplated that the relative position of these members may be reversed. I am also aware that many changes may be made in the single illustrative embodiment without departing from the spirit of the invention, which is claimed as follows.

I claim:

1. A lens mount structure comprising a pair of telescopically associated sleeves, screw thread means respectively upon said sleeves and mutually meshed whereby relative rotation of said sleeves will effect relative axial movement thereof for changing the focus of such structure, complemental scale and index members of which the index member is adjustable rotatively upon one of said sleeves for orientation thereon and of which members the scale member is adjustable rotatively of and upon the other of said sleeves to dispose the scale thereon in coordinated relation with the relative axial position of said sleeves and with the index on said index member, means for retaining said index member in the oriented position on said one sleeve, and additional means for retaining the scale member in said coordinated relation upon said other sleeve.

2. A lens mount structure comprising a pair of coaxially associated members which are relatively rotatable for effecting an adjustment of said structure, screw thread means upon and adjacently to an end of one of said coaxial members and for establishing a connection of said structure with an instrument in unpredetermined rotational relation with respect therewith pursuant to rotation of said member relatively to said instrument, abutment means upon said one member adjacently to said screw thread means, complemental scale and index members respectively upon and adjustable rotatively of said coaxial members, means for securing the complemental member associated with said one sleeve to such sleeve against said abutment means and in a selectively oriented position with respect thereto obtained by such rotative adjustment, and means for securing the other of said complemental members to the other of said coaxial members and in a position of rotative adjustment constituting coordinated orientation with respect to the other of said complemental members.

3. A lens mount structure comprising a pair of coaxial telescopically associated sleeves, screw thread means respectively upon said sleeves and mutually meshed whereby relative rotation of said sleeves will effect relative axial movement thereof for changing the focus of said structure, additional screw thread means upon and adjacently to an end of one of said sleeves and for establishing a connection of said structure with and instrument in unpredetermined rotational relation therewith pursuant to rotation of said sleeve relative to to said instrument, camming groove means extending circumferentially of said sleeve adjacently to said additional screw thread means, circumferentially disposed abutment means upon said sleeve adjacently to said groove, complemental scale and index members respectively upon said sleeves and adjustable rotatively thereof, wedge means carried in the complemental member on said one sleeve and advanceable against a side of said camming groove for pressing said complemental member against said abutment means as an expedient for holding said complemental member in a selected position of rotation with respect to said sleeve, and means for securing the other of said complemental members to the other of said sleeves and in a position of rotative adjustment thereon constituting coordinated orientation with respect to the other of said complemental members.

4. A lens mount structure comprising a pair of coaxial telescopically associated sleeves, screw thread means respectively upon said sleeves and mutually meshed whereby relative rotation of said sleeves will effect relative axial movement thereof for changing the focus of said structure, additional screw thread means upon and adjacently to an end of one of said sleeves and facilitating connection of said structure with an instrument in unpredetermined relation therewith pursuant to rotation of said sleeve relatively to said instrument, a flange circumscribing said sleeve adjacently to said end but removed therefrom further than said additional thread means, camming means extending circumferentially of said sleeve adjacently to said flange but further removed from said end, a bearing section upon said sleeve adjacently to said camming means and still further removed from said end, a bearing section upon the other of said sleeves, complemental scale and index members each including an internal bearing section, said complemental members being disposed with their bearing sections respectively upon the bearing sections of said sleeves, set screw means carried in the complemental member on said one sleeve and advanceable against said camming means for wedging said complemental member against said flange as an expedient for holding said complemental member in a selected position of rotation on said sleeve, and means for securing the other of said complemental members to the other of said sleeves and in a position of rotative adjustment thereon constituting coordinated orientation with respect to said one of said complemental members.

5. A lens mount structure comprising screw threads adjacently to one of its ends and for establishing connection with an instrument pursuant to rotation of said structure relatively to said instrument, said structure also comprising a circumferential camming groove adjacently to said screw threads, circumferentially disposed abutment means adjacently to said groove, a scale index member adjustable rotatively of said structure for orientation with respect to said instrument, and wedge means on said scale index member and advanceable against a side of said camming groove for pressing said index member against said abutment means as an expedient for holding said index member in a selected position of orientation.

6. A lens mount structure comprising at one end screw thread means facilitating connection thereof with an instrument pursuant to rotation of said structure relatively to said instrument, a flange circumscribing such structure adjacently to said end but more removed therefrom than said screw thread means, camming means extending circumferentially of said structure adjacently to said flange but further removed from said end, a bearing section adjacently to said camming means and still further removed from said end, a scale index member having an internal bearing surface disposed upon the first mentioned bearing surface to facilitate rotative adjustment of said index member for orientation thereof with respect to said instrument, and set screw means disposed radially of said structure and extending through said index member and cooperable with said camming groove means for retaining said index member in abutted relation with said flange and in a selected position of orientation.

IRVING CISSKI.